(12) United States Patent
Kaneyoshi

(10) Patent No.: US 6,410,471 B2
(45) Date of Patent: Jun. 25, 2002

(54) METHOD FOR PREPARATION OF SINTERED BODY OF RARE EARTH OXIDE

(75) Inventor: Masami Kaneyoshi, Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/783,602

(22) Filed: Feb. 15, 2001

(30) Foreign Application Priority Data

Mar. 7, 2000 (JP) ........................................ 2000-062361

(51) Int. Cl.⁷ ..................... C04B 35/50; B29C 43/00; B29C 67/24; B29C 67/04
(52) U.S. Cl. ................. 501/152; 264/603; 264/614; 264/681; 264/239; 264/241; 264/340; 264/345; 264/109
(58) Field of Search ..................... 501/152; 264/603, 264/239, 241, 340, 345, 109, 614, 681

(56) References Cited

U.S. PATENT DOCUMENTS 5,061,560 A * 10/1991 Tajima et al. ............. 23/313 R
5,384,293 A * 1/1995 Omori et al. ............... 501/128
5,902,763 A * 5/1999 Waku et al. ................ 501/127

* cited by examiner

*Primary Examiner*—Elizabeth D. Wood
(74) *Attorney, Agent, or Firm*—Wenderoth, Lind & Ponack, L.L.P.

(57) ABSTRACT

Disclosed is a method for the preparation of a high-quality sintered body of a rare earth oxide or a composite oxide of a rare earth oxide and an adjuvant oxide such as aluminum oxide. The method comprises shaping a rare earth oxide powder characterized by specified particle diameter distribution values of $D_{50}$ and $D_{90}$ and a specified specific surface area or a powder blend of the rare earth oxide and adjuvant oxide into a powder compact and subjecting the powder compact to a sintering heat treatment at a specified sintering temperature by increasing and decreasing the temperature up to and from the sintering temperature each at a rate not exceeding a specified upper limit.

17 Claims, No Drawings

METHOD FOR PREPARATION OF SINTERED BODY OF RARE EARTH OXIDE

BACKGROUND OF THE INVENTION

The present invention relates to a method for the preparation of a sintered body of a rare earth oxide. More particularly, the invention relates to a method for the preparation of a sintered body of a rare earth oxide having a large sintering density and a small average crystallite diameter. The invention also relates to a method for the preparation of an oxide mixture mainly consisting of a rare earth oxide with a non-rare earth adjuvant oxide, which crystallographically consists of a single phase.

As is well known, sintered bodies of a rare earth oxide generally have an outstandingly high corrosion resistance against halogen gases or halogen-containing gases and melt of a metal or alloy. By virtue of this unique property, applications in various fields can be expected for the articles of a sintered rare earth oxide body. Besides, sintered bodies of a rare earth oxide are each a potential material in the applications as a dielectric material, magnetic material, optical functional material and so on. For example, yttrium aluminum garnet, referred to as YAG hereinafter, having a chemical composition of $Y_3Al_5O_{12}$ as a composite oxide of yttrium and aluminum belongs crystallographically to the cubic system having isotropy and a high-density sintered body of YAG, which is nothing other than a polycrystalline body, may exhibit high transmissivity to visible light close to that of a single crystal or glassy body of YAG. Further, sintered bodies of a composite oxide consisting of a rare earth oxide, such as oxides of yttrium, dysprosium and terbium, and iron oxide have an application as a material of magnetooptical devices.

It is important in most applications of a sintered body of rare earth oxides in order to exhibit the inherently high performance that the sintered body has a sintering density, i.e. the actual density of the sintered body relative to the true density of the oxide, as close to the true density of the oxide as possible and that the sintered body consists of a crystallographically single phase. These desirable characteristics of a sintered body of a rare earth oxide largely depend on the physical properties of the starting oxide particles and it is generally a very difficult matter to obtain a sintered body of a rare earth oxide even by undertaking improvements and optimization of the process conditions for the preparation of a sintered body.

SUMMARY OF THE INVENTION

The present invention accordingly has an object, in view of the above described problems and difficulties in the prior art methods for the preparation of a sintered body of a rare earth oxide or an oxide mixture mainly composed of a rare earth oxide or a rare earth oxide-based oxide mixture, to provide a novel and reliable method for the preparation of a sintered body of a rare earth oxide or a rare earth oxide-based oxide mixture having a large sintering density and consisting of a crystallographically single phase with a small average crystal-lite diameter.

Thus, the method of the present invention for the preparation of a sintered body of a rare earth oxide comprises the steps of:

(a) molding a powder of a rare earth oxide, of which the $D_{50}$ value of the particle diameter distribution does not exceed 2.0 μm, the $D_{90}$ value of the particle diameter distribution does not exceed 3.0 μm and the specific surface area is in the range from 5 to 20 m²/g, into a powder compact; and (b) subjecting the powder compact to a heat treatment for sintering at a temperature of 1000° C. or higher, in which the rate of temperature elevation does not exceed 500° C. per hour and the rate of temperature decrease does not exceed 600° C. per hour.

It is preferable in the above defined inventive method that the $D'_{50}$ value of the pore diameter distribution of the rare earth oxide particles does not exceed 20 nm.

It is further optional that the starting rare earth oxide powder defined above is admixed with an adjuvant oxide of an element selected from the group consisting of magnesium, aluminum, silicon, titanium, vanadium, chromium, manganese, iron, cobalt, nickel, copper, zinc, gallium, germanium, zirconium, niobium, molybdenum, indium, tin, hafnium, tantalum and tungsten in a limited proportion so as to give a sintered body of a rare earth-based composite oxide. When a sintered body is prepared from an oxide mixture of a rare earth oxide and one or more of these adjuvant oxides, it is desirable that the amount of the rare earth oxide is at least 40% by weight based on the total amount of the oxide mixture.

DETAILED DESCRIPTION OF THE PREFERRED EMBODIMENTS

The above defined present invention has been completed as a result of the extensive investigations undertaken by the inventor on the relationship between the physical properties of the rare earth oxide powder as the starting material and the physical properties of a sintered body of the rare earth oxide obtained from the oxide powder. The investigations have led to a discovery that a sintered body of a rare earth oxide having the most desirable properties can be obtained when the starting rare earth oxide powder has optimum values of the parameters including the average particle diameter, particle diameter distribution, specific surface area and pore diameter distribution.

Thus, the starting rare earth oxide powder, which is compression-molded into a powder compact in step (a) of the inventive method, should have the particle diameter distribution values $D_{50}$ and $D_{90}$, which can be determined by the laser diffraction method, not exceeding 2.0 μm and 3.0 μm, respectively, and a specific surface area in the range from 5 m²/g to 20 m²/g. The above mentioned particle diameter distribution value expressed by the symbol $D_n$ is defined in such a way that the particles having a particle diameter not exceeding $D_n$, e.g., in μm unit, constitute n% by weight of the whole powder.

The rare earth elements forming a rare earth oxide, to which the inventive preparation method is applicable, include yttrium and the elements having an atomic number in the range from 57 to 71 on the Periodic Table. Each of the rare earth oxides, excepting the oxides of cerium, praseodymium and terbium, has a chemical composition of the formula $R_2O_3$, in which R is the rare earth element, while the oxides of the above mentioned cerium, praseodymium and terbium are expressed usually by the formulas of $CeO_2$, $Pr_6O_{11}$ and $Tb_4O_7$, respectively. These rare earth oxide powders can be used either singly or as a blend of two kinds or more according to need. The method of the present invention is applicable more successfully to the oxides of yttrium, gadolinium, dysprosium, holmium, erbium, thulium, ytterbium and lutetium or, in particular, to yttrium oxide among the above mentioned rare earth oxides.

As is mentioned before, the rare earth oxide powder as the starting material in the inventive method must satisfy the requirements for the granulometric parameters including the particle diameter distribution values, specific surface area and, desirably, pore diameter distribution. When the particle diameter distribution of a powder is measured by the laser diffraction method, the center value of distribution and presence of coarse particles must be taken into consideration.

The $D_{50}$ value of the starting rare earth oxide powder according to the above given definition should not exceed 2.0 μm or, preferably, should not exceed 1.5 μm or, more preferably, should be in the range from 0.9 to 1.3 μm. When the $D_{50}$ value of the starting rare earth oxide powder is too large, the process of sintering cannot proceed as desired not to give a high sintering density of the sintered body unless the sintering temperature is unduly increased. When a sintered body of a rare earth-based composite oxide with an adjuvant oxide is to be prepared, in addition, the reaction between the oxides can hardly be complete with coarse rare earth oxide particles not to give a crystallographically uniform sintered body which eventually comprises undesired oxide phases and the unreacted starting oxide phases.

The $D_{90}$ value of the starting rare earth oxide powder according to the above given definition should not exceed 3.0 μm or, preferably, should not exceed 2.7 μm or, more preferably, should be in the range from 1.9 to 2.3 μm. When the $D_{90}$ value is too large, the disadvantage caused thereby is similar to that caused with a too large $D_{50}$ value mentioned above. In addition, the average crystallite diameter cannot be small enough with a large variation of the diameters adversely affecting the mechanical strengths of the sintered body. The crystallite diameter of a sintered body can be determined from an electron-microscopic photograph of a section of the sintered body along with an electron-microscopic examination of the surface of the section.

The specific surface area of the rare earth oxide powder can be determined by the so-called BET method by measuring the volume of nitrogen gas adsorbed on the unit amount of the powder at the boiling point of liquid nitrogen, i.e. −196° C. The starting rare earth oxide powder should have a specific surface area in the range from 5 to 20 m$^2$/g or, preferably, from 7 to 18 m$^2$/g or, more preferably, from 10 to 15 m$^2$/g. When the specific surface area of the starting rare earth oxide powder is too small, the oxide particles have low reactivity so that the process of sintering cannot proceed as desired and the reaction with the adjuvant oxide particles can hardly proceed. When the specific surface area is too large, on the other hand, local unevenness of sintering is sometimes unavoidable with partial oversintering and the crystallite diameter in the sintered body cannot be fine enough with a large variation or unevenness sometimes leaving closed pores at the grain boundaries in addition to the problem that a single-phase sintered body can hardly be obtained in a sintered body of a rare earth oxide-based composite oxide with an adjuvant oxide.

A further granulometric parameter to be determined of the starting rare earth oxide powder is the pore diameter distribution value $D'_{50}$ which should not exceed 20 nm or, preferably, should be in the range from 10 to 20 nm. When the $D'_{50}$ value of the starting rare earth oxide powder is too large, the sintering behavior of the oxide powder is adversely affected. The pore diameter distribution value $D'_{50}$ is defined in such a way that 50% of the overall pore volume of the particles is occupied by the pores of which the pore diameter does not exceed $D'_{50}$ (nm). The $D'_{50}$ value can be determined by the so-called BJH method from the adsorption and desorption behavior of nitrogen gas on and from the oxide powder under varied pressures.

Following is a description of steps of the inventive method for the preparation of a sintered body of a rare earth oxide or of a rare earth oxide-based composite oxide. When the target product is a sintered body of a rare earth oxide-based composite oxide, the first step is mixing of the rare earth oxide powder and an adjuvant oxide powder as intimately as possible by using a suitable powder-mixing tool such as mortars and pestles or, preferably, by using a powder-mixing machine such as a ball mill either as a dry-blending process or as a wet-blending process with admixture of water or an organic solvent or, preferably, water from the standpoint of safety and environmental pollution. When the wet-process powder mixing is undertaken, the wetting water or solvent is usually removed from the wet mixture or slurry of the powders by evaporation to give a dried powder blend.

The first of the essential steps in the inventive method is molding of a rare earth oxide powder or, when the above described powder blending has been undertaken, the powder blend into a powder compact by a suitable molding method such as compression molding in a metal mold, so-called slip casting using a mold of a liquid-absorbent material such as gypsum and hydrostatic compression method. When the slip casting method is undertaken with a powder blend, it is of course that the wet powder blend or slurry obtained by the wet-process mixing need not be dried into a dried powder blend. The method of hydrostatic compression is advantageous because the density of the powder compact obtained by this method is high as compared with the other molding methods consequently resulting in a small shrinkage of the powder compact in the subsequent step of sintering. The pressure of the hydrostatic compression medium in the hydrostatic compression molding method should be at least 100 MPa or, desirably, at least 150 MPa.

The step to follow the above described molding step of the rare earth oxide powder or a powder blend is a heat treatment of the powder compact for sintering which is conducted in an electric furnace under an atmosphere of the atmospheric air, non-reactive gas or reducing gas or in vacuum depending on the types of the desired sintered bodies. Most conveniently, the atmosphere for sintering can be the atmospheric air when the sintered body to be obtained is that of a single rare earth oxide or of a rare earth oxide-based composite oxide including rare earth aluminum garnets $R_3Al_5O_{12}$ such as YAG, rare earth iron garnets $R_3Fe_5O_{12}$ such as yttrium iron garnet (YIG), yttrium titanate $Y_2Ti_2O_7$ of the pyrochlore type and so on.

The highest temperature to be reached in the heat treatment for sintering, referred to as the sintering temperature hereinafter, is, though dependent on the types of the sintered body to be obtained, 1000° C. or higher or, preferably, in the range from 1200 to 1900° C. or, more preferably, in the range from 1400 to 1800° C. When the sintering temperature is too low, sintering of the powder compact cannot proceed completely as a matter of course while sintering at a too high temperature is unavoidably accompanied by a disadvantage due to premature degradation of the heater elements installed in the electric furnace by the evaporation of vaporizable constituents therein.

The length of time for keeping the powder compact under sintering at the sintering temperature is desirably at least one hour in order to accomplish complete sintering of the body. It is preferable in the heat treatment that the rate of temperature elevation to reach the sintering temperature does not exceed 500° C. per hour or, preferably, is in the range from 150 to 400° C. per hour, desirably, at least in the temperature range from 500° C. to the sintering temperature. When the rate of temperature elevation is too high, the sintered body may eventually suffer a defect such as cracks and chippings while a rate of temperature elevation smaller than 150° C. per hour has no particular advantages thereby rather with an economical disadvantage due to a decrease in the productivity. The cooling rate of the body after the heat treatment at the sintering temperature down to room temperature or, desirably, at least down to 500° C. should not exceed 600° C. per hour. When the sintered body is cooled down too rapidly, the sintered body eventually suffers defects of deformation, cracks and chippings.

In the following, the present invention is described in more detail by way of examples and comparative examples, which, however, never limit the scope of the invention in any way.

In the experiments described below, characterization of the rare earth oxide powders was made for the items including the particle diameter distribution, specific surface area and pore diameter distribution according to the testing procedures given below.

The particle diameter distribution of the oxide powders was measured by the laser diffraction method by using an instrument therefor (Model Microtrac FRA 9220, manufactured by Leeds & Northrup Co.) to give the values of $D_{10}$, $D_{50}$ and $D_{90}$ in μm units. The BET specific surface area and the pore diameter distribution of the oxide powders were determined by the BJH method using an instrument for gas adsorption and desorption measurements (Model Coulter SA3100, manufactured by Coulter Electronics Co.) to give the specific surface area in $m^2/g$ units and to give the values of $D'_{50}$ in nm units.

Experiment 1

Powders of yttrium oxide were taken from four different lots A, B, C and D of yttrium oxide products and they were subjected to characterization as mentioned above to give the results summarized in Table 1 below.

TABLE 1

| Yttrium oxide, lot | Particle diameter distribution, μm | | | Specific surface area, $m^2/g$ | Pore diameter distribution, $D'_{50}$, nm |
|---|---|---|---|---|---|
| | $D_{10}$ | $D_{50}$ | $D_{90}$ | | |
| A | 0.69 | 1.10 | 2.15 | 13.2 | 17.3 |
| B | 0.94 | 1.74 | 4.13 | 39.1 | 31.7 |
| C | 0.65 | 1.16 | 3.22 | 12.1 | 22.8 |
| D | 1.67 | 3.51 | 6.27 | 7.9 | 38.7 |

A 100 g portion taken from each of these yttrium oxide powders A to D was introduced into a rubber mold having an inner diameter of 50 mm and tightly sealed therein with a rubber stopper to be subjected to hydrostatic molding in a hydrostatic press under a pressure of 200 MPa. The thus hydrostatically molded powder compacts taken out of the rubber mold were subjected to a sintering heat treatment in an electric furnace under an atmosphere of air at a sintering temperature of 1700° C. for 4 hours. The rate of temperature elevation up to this sintering temperature was 300° C. per hour and the cooling rate from 1700° C. down to room temperature was also 300° C. per hour.

The thus obtained sintered bodies of yttrium oxide by uaing the yttrium oxide powders A, B, C and D, referred to as the sintered bodies 1A, 1B, 1C and 1D, respectively, were electron microscopically examined for the surface. The average crystallite diameters were determined on the electron microscopic photographs to give the results shown in Table 2 below. The sintered bodies were subjected to the measurement of the density to give the results in Table 2 as a relative density in % which is the ratio of the sintering density to the theoretical density 5.03 $g/cm^3$ of yttrium oxide.

TABLE 2

| Sintered body | Relative density, % | Average crystallite diameter, nm |
|---|---|---|
| 1A | 99.7 | 9.2 |
| 1B | 99.5 | 26 |
| 1C | 99.4 | 19 |
| 1D | 98.2 | 14 |

The results of Table 2 indicate that the sintered body 1A among the four had the highest sintering density and smallest average crystallite diameter. In fact, the sintered body 1A had the highest mechanical strength and heat-shock resistance and was free from occurrence of any noticeable cracks or fissures on the surface.

Experiment 2

Powder blends of yttrium oxide and aluminum oxide in a molar ratio of 3:5 corresponding to the chemical composition of YAG were prepared each by ball-milling 57.06 g of one of the yttrium oxide powders A to D used in Experiment 1 and 42.94 g of an aluminum oxide powder having a $D_{50}$ value of about 0.3 μm and a $D_{90}$ value of about 1.1 μm (Taimicron TM-DA, a product by Taimei Chemical Co.) with addition of 100 ml of water for 3 hours in an alumina pot containing alumina balls of about 5 mm diameter followed by removal of the alumina balls from the slurry by screening and drying of the slurry to give a dried cake of the powder blend which was lightly disintegrated with a mortar and pestle into a powder to serve as the base material for the preparation of sintered bodies.

These powder blends were each subjected to hydrostatic molding and a sintering heat treatment in substantially the same manner as in Experiment 1 except that the sintering temperature was 1600° C. instead of 1700° C. The thus obtained sintered bodies are referred to hereinafter as the sintered bodies 2A, 2B, 2C and 2D corresponding to the yttrium oxide powders A, B, C and D, respectively.

Each of the sintered bodies 2A to 2D was subjected to the measurement of the density by the in-water weighing method to give the relative density in %, which was the ratio of the sintering density of the sintered body to the theoretical density 4.55 $g/cm^3$ of YAG, as shown in Table 3 below.

According to the results of the powder X-ray diffractometry undertaken with the sintered bodies, the sole or major constituent phase of the sintered bodies was YAG which was, in some samples, accompanied by other minor phases including the phase of $YAlO_3$, referred to as YAP hereinafter, the phase of $Y_4Al_2O_9$, referred to as YAM hereinafter, and the phase of yttrium oxide $Y_2O_3$.

A 15 mm square and 3 mm thick plate specimen was taken by cutting each of the sintered bodies 2A to 2D with polishing of the square surfaces. A quantitative X-ray diffractometric analysis was undertaken with the thus finished square specimens to determine the contents of the yttrium atoms in the respective crystallographic phases from the intensities of the diffraction peaks by making reference to authentic standard specimens to give the results shown in Table 3 below for the phases of YAG, YAP, YAM and $Y_2O_3$.

The above prepared surface-polished square specimens were subjected to the measurement of light transmissivity for light of 550 nm wavelength on a spectrophotometer. The results in % transmission are shown in Table 3 below.

TABLE 3

| Sintered body | % Yttrium atoms contained in the phase of | | | | Light transmission, % | Relative density, % |
|---|---|---|---|---|---|---|
| | YAG | YAP | YAM | $Y_2O_3$ | | |
| 2A | 100 | 0 | 0 | 0 | 68 | 99.8 |
| 2B | 91 | 6 | 1 | 1 | 49 | 99.9 |
| 2C | 94 | 3 | 0 | 0 | 44 | 99.7 |
| 2D | 87 | 7 | 2 | 2 | 36 | 99.8 |

The sintered body 2A is characteristic in consisting of a single crystallographic phase of YAG and having a high light transmissivity as compared with the other sintered bodies so that this material could be employed as a material of windows of special lamps.

The results summarized in Tables 1 to 3 clearly support the conclusion leading to the present invention that the particle diameter distribution values and the specific surface area of the rare earth oxide powder are the most important granulometric parameters which determine the quality of the sintered bodies of the rare earth oxides and rare earth oxide-based composite oxides.

What is claimed is:

1. A method for the preparation of a sintered body of a rare earth oxide which comprises the steps of:

(a) shaping a powder of the rare earth oxide, of which the $D_{50}$ value of the particle diameter distribution does not exceed 2.0 μm, the $D_{90}$ value of the particle diameter distribution does not exceed 3.0 μm and the specific surface area is in the range from 5 to 20 m²/g, into a powder compact; and (b) subjecting the powder compact to a heat treatment for sintering at a sintering temperature of 1000° C. or higher for at least 1 hour, in which the rate of temperature elevation in the range from 500° C. to the sintering temperature does not exceed 500° C. per hour and the rate of temperature decrease from the sintering temperature does not exceed 600° C. per hour.

2. The method for the preparation of a sintered body of a rare earth oxide as claimed in claim 1 in which the $D_{50}$ value of the particle diameter distribution of the rare earth oxide powder does not exceed 1.5 μm.

3. The method for the preparation of a sintered body of a rare earth oxide as claimed in claim 1 in which the $D_{50}$ value of the particle diameter distribution of the rare earth oxide powder is in the range from 0.9 to 1.3 μm.

4. The method for the preparation of a sintered body of a rare earth oxide as claimed in claim 1 in which the $D_{90}$ value of the particle diameter distribution of the rare earth oxide powder does not exceed 2.7 μm.

5. The method for the preparation of a sintered body of a rare earth oxide as claimed in claim 1 in which the $D_{90}$ value of the particle diameter distribution of the rare earth oxide powder is in the range from 1.9 to 2.3 μm.

6. The method for the preparation of a sintered body of a rare earth oxide as claimed in claim 1 in which the specific surface area of the rare earth oxide powder is in the range from 7 to 18 m²/g.

7. The method for the preparation of a sintered body of a rare earth oxide as claimed in claim 1 in which the specific surface area of the rare earth oxide powder is in the range from 10 to 15 m²/g.

8. The method for the preparation of a sintered body of a rare earth oxide as claimed in claim 1 in which the $D'_{50}$ value of the pore diameter distribution of the rare earth oxide powder does not exceed 20 nm.

9. The method for the preparation of a sintered body of a rare earth oxide as claimed in claim 1 in which the sintering temperature is in the range from 1200 to 1900° C.

10. The method for the preparation of a sintered body of a rare earth oxide as claimed in claim 1 in which the sintering temperature is in the range from 1400 to 1800° C.

11. The method for the preparation of a sintered body of a rare earth oxide as claimed in claim 1 in which shaping of the rare earth oxide powder into a powder compact is conducted by hydrostatic compression.

12. The method for the preparation of a sintered body of a rare earth oxide as claimed in claim 11 in which the pressure of hydrostatic compression is at least 100 MPa.

13. The method for the preparation of a sintered body of a rare earth oxide as claimed in claim 11 in which the pressure of hydrostatic compression is at least 150 MPa.

14. The method for the preparation of a sintered body of a rare earth oxide as claimed in claim 1 in which the rate of temperature elevation is in the range from 150 to 400° C. per hour.

15. A method for the preparation of a sintered body of a rare earth oxide-based composite oxide with a n adjuvant oxide which comprises the steps of:

(a) blending a powder of the rare earth oxide, of which the $D_{50}$ value of the particle diameter distribution does not exceed 2.0 μm, the $D_{90}$ value of the particle diameter distribution does not exceed 3.0 μm and the specific surface area is in the range from 5 to 20 m²/g, and an adjuvant oxide of an element selected from the group consisting of magnesium, aluminum, silicon, titanium, vanadium, chromium, manganese, iron, cobalt, nickel, copper, zinc, gallium, germanium, zirconium, niobium, molybdenum, indium, tin, hafnium, tantalum and tungsten to give a powder blend;

(b) shaping the powder blend into a powder compact; and (c) subjecting the powder compact to a heat treatment for sintering at a sintering temperature of 1000° C. or higher for at least 1 hour, in which the rate of temperature elevation in the range from 500° C. to the sintering temperature does not exceed 500° C. per hour and the rate of temperature decrease from the sintering temperature does not exceed 600° C. per hour.

16. The method for the preparation of a sintered body of a rare earth oxide-based composite oxide with an adjuvant oxide as claimed in claim 15 in which the amount of the rare earth oxide powder in the powder blend is at leasr 40% by weight based on the total amount of the powder blend.

17. The method for the preparation of a sintered body of a rare earth oxide-based composite oxide with an adjuvant oxide as claimed in claim 15 in which the adjuvant oxide is selected from the group consisting of the oxides of iron, aluminum, silicon, titanium, gallium and zirconium.

* * * * *